(12) United States Patent
Siddique et al.

(10) Patent No.: US 12,228,806 B2
(45) Date of Patent: Feb. 18, 2025

(54) SYSTEM AND METHOD OF DEVELOPING NANOSTRUCTURED MULTIFUNCTIONAL SMART CONTACT LENS

(71) Applicant: Samsung Electronics Co., Ltd., Suwon-si (KR)

(72) Inventors: Radwanul Hasan Siddique, Monrovia, CA (US); Vinayak Narasimhan, Redwood City, CA (US); Hyuck Choo, Yongin-Si (KR); Kamil Bojanczyk, San Jose, CA (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 1015 days.

(21) Appl. No.: 17/131,469

(22) Filed: Dec. 22, 2020

(65) Prior Publication Data

US 2021/0223571 A1 Jul. 22, 2021

Related U.S. Application Data

(60) Provisional application No. 63/066,156, filed on Aug. 14, 2020, provisional application No. 62/962,924, filed on Jan. 17, 2020.

(51) Int. Cl.
*G02C 7/04* (2006.01)
*B29D 11/00* (2006.01)
(Continued)

(52) U.S. Cl.
CPC ........ *G02C 7/049* (2013.01); *B29D 11/00192* (2013.01); *G01N 21/65* (2013.01); *G02C 11/10* (2013.01)

(58) Field of Classification Search
CPC .......... G02C 7/049; G02C 11/10; G02C 7/04; B29D 11/00192; B29D 11/00826;
(Continued)

(56) References Cited

U.S. PATENT DOCUMENTS 8,092,892 B2    1/2012 Keppner et al.
8,309,216 B2   11/2012 Ohrlander et al.
(Continued)

FOREIGN PATENT DOCUMENTS

WO    2018/078420 A1    5/2018
WO    2019/122435 A1    6/2019

OTHER PUBLICATIONS

Jin-Chern Chiou, et al., "A wirelessly powered smart contact lens with reconfigurable wide range and tunable sensitivity sensor readout circuitry", Sensors vol. 17, Issue 1,108. 12 pgs, Jan. 7, 2017.
(Continued)

*Primary Examiner* — James C. Jones
(74) *Attorney, Agent, or Firm* — Womble Bond Dickinson

(57) ABSTRACT

A smart contact lens includes a contact lens, a nanostructures layer, a first sensor, a connector, and a smart module. The nanostructures layer may be anti-bacterial. The smart contact lens may be worn on an eye or may be implanted within an eye. The nanostructures layer is fabricated by depositing a colloidal dispersion onto an electrostatically-coated substrate. The colloidal dispersion is then removed and nanoholes are etched. The electrostatic coating is removed and a biocompatible material is spin-coated onto the substrate. Upon removal, a quasi-randomly distributed nanostructures layer forms.

11 Claims, 9 Drawing Sheets

(51) Int. Cl.
*G01N 21/65* (2006.01)
*G02C 11/00* (2006.01)

(58) Field of Classification Search
CPC ........ B29D 11/00884; B29D 11/00038; B29D 11/00865; G01N 21/65; B82B 3/0009; B82Y 40/00

See application file for complete search history.

(56) References Cited

U.S. PATENT DOCUMENTS

| | | |
|---|---|---|
| 8,513,353 B2 | 8/2013 | Chow et al. |
| 8,608,310 B2 | 12/2013 | Otis et al. |
| 8,767,309 B2 | 7/2014 | Pugh et al. |
| 8,874,182 B2 | 10/2014 | Etzkorn et al. |
| 9,395,558 B2 | 7/2016 | de Juan, Jr. et al. |
| 2010/0113901 A1* | 5/2010 | Zhang .................... G02C 7/04 600/319 |
| 2016/0235347 A1* | 8/2016 | Baig .................. A61B 5/14532 |
| 2017/0049395 A1 | 2/2017 | Cao |

OTHER PUBLICATIONS

Young-Joon Kim, et al., "Eyeglasses-powered, contact lens-like platform with high power transfer efficiency", Biomedical Microdevices, New York vol. 17, Issue 4, pp. 3-9, Aug. 1, 2015.

\* cited by examiner

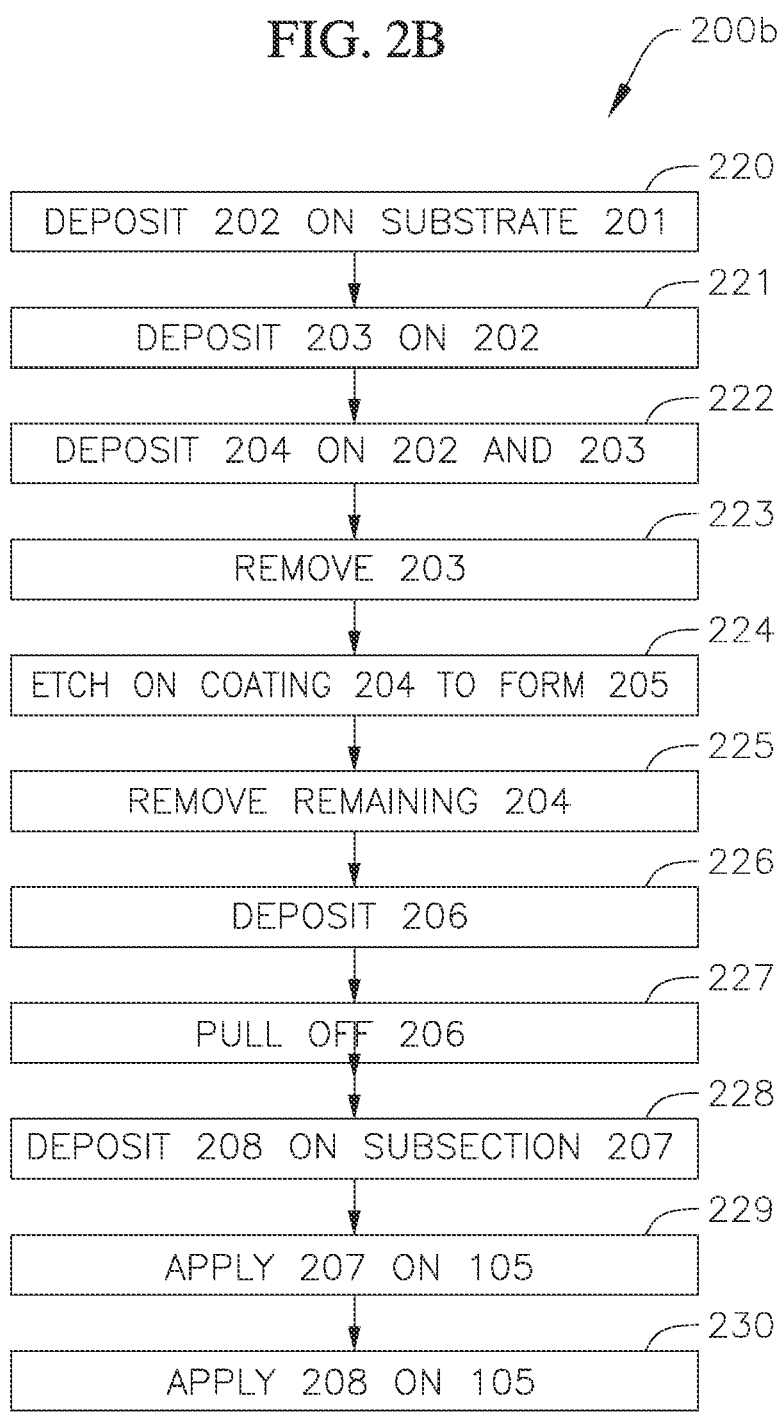

FIG. 4
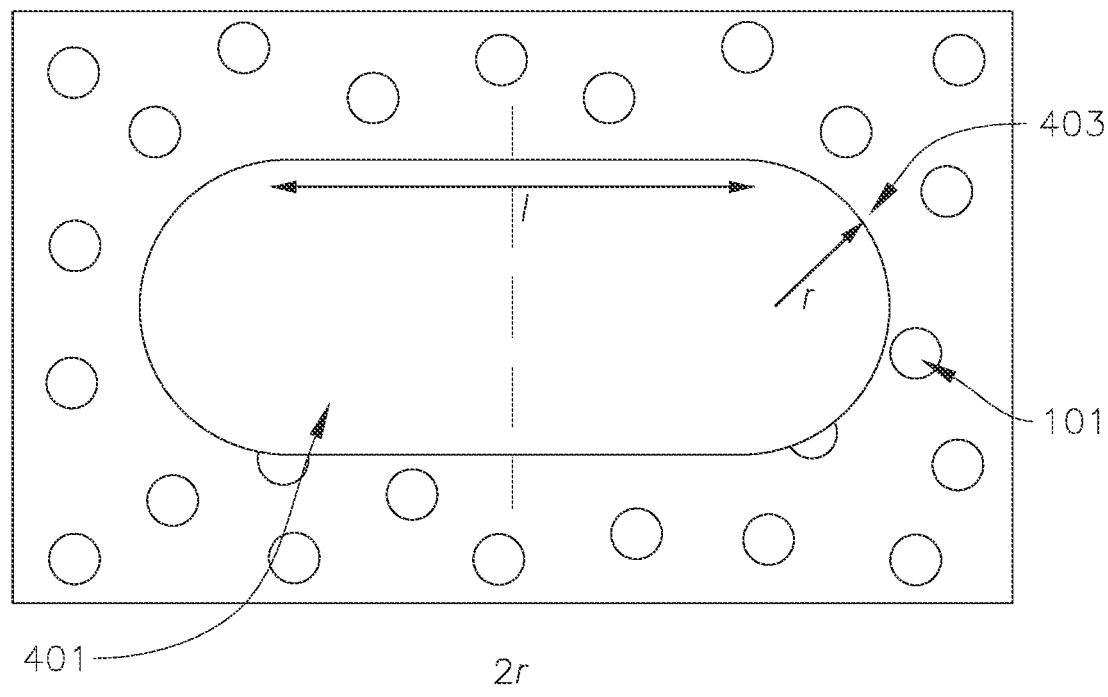
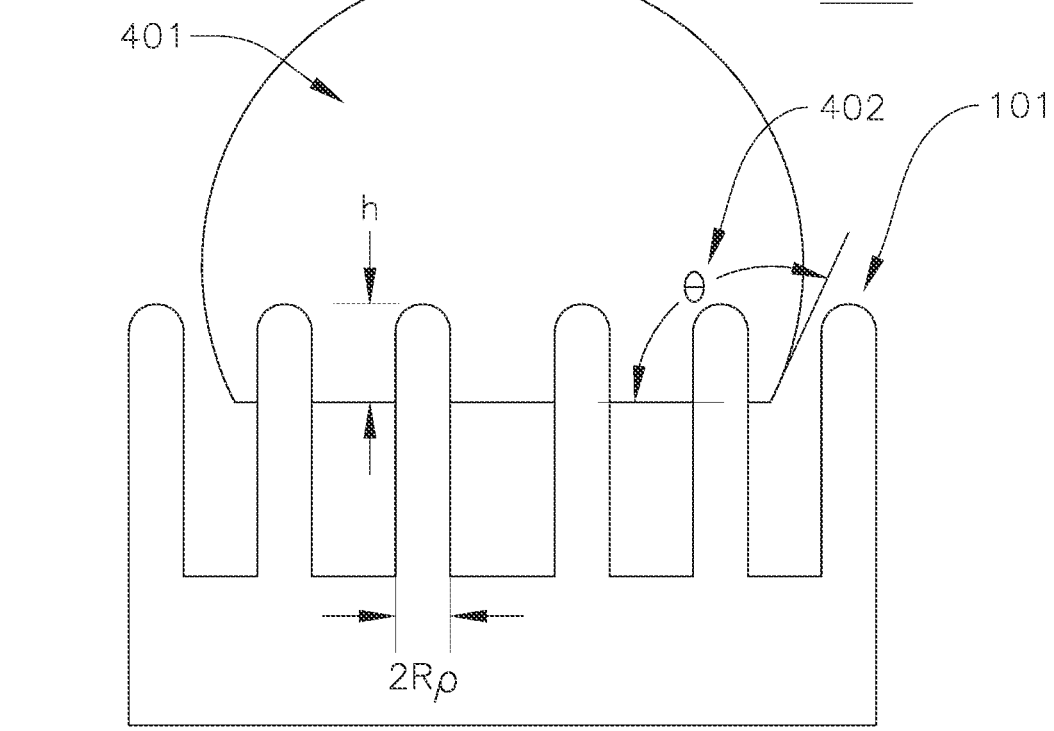

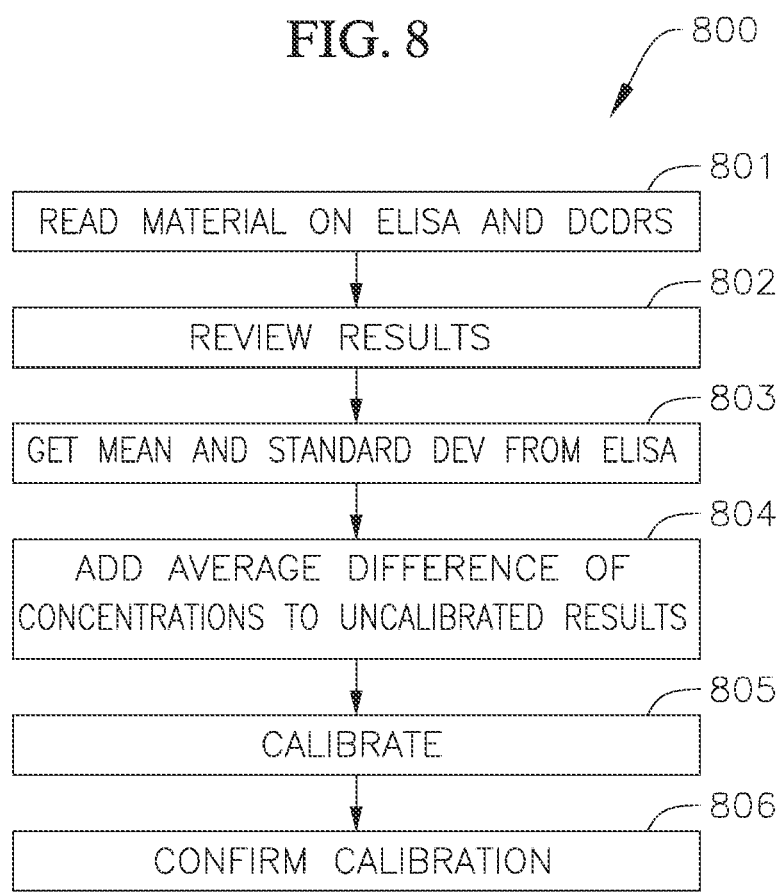

SYSTEM AND METHOD OF DEVELOPING NANOSTRUCTURED MULTIFUNCTIONAL SMART CONTACT LENS

CROSS-REFERENCE TO RELATED APPLICATION

This application claims the priority benefit under 35 U.S.C. § 119 (c) of U.S. Provisional Application No. 62/962,924, filed on Jan. 17, 2020, and Application No. 63/066,156, filed on Aug. 14, 2020, the disclosures of which is incorporated herein by reference in its entirety.

TECHNICAL FIELD

The subject matter disclosed herein relates to smart contact lenses. More specifically, the subject matter disclosed herein relates to a nanostructure-coated contact lens that provides for glare reduction, an antibacterial surface, and Raman spectroscopy for analyzing biomaterial.

BACKGROUND

Contact lenses, also known as scleral lenses, are worn by an estimated 140 million people worldwide. In recent years, contact lenses have attracted attention for their ability to provide enhanced testing capabilities. Smart contact lenses may enhance regular contact lenses in many ways, such as reducing glare, protecting against bacterial growth on lenses, providing testing capabilities for tears, and enabling augmented reality, to name a few. To date, there are no smart contact lenses that are antibacterial, reduce glare, and provide for a simplified testing area that can test biomaterials and is easy to manufacture.

The ability to reduce bacterial growth on contact lenses is highly desirable. Bacterial growth on contact lenses may lead to dangerous eye infections. It is desirable to reduce or eliminate bacterial growth on the eye.

Glare is another aspect of contact lenses that is unfavorable. Glare causes uncomfortable and sometimes dangerous conditions for contact wearers. It is desirable to reduce or minimize glare on contact lenses.

Testing capabilities of contacts are still difficult and cumbersome. Attempts to integrate flexibly circuitry, power sources, and sensors to date have not produced commercially feasible contact lenses. Most solutions are bulky, complicated to use, and are highly specialized. Various commercially available techniques exists for tear biomarker analyses, however, they are often expensive and require specialized equipment, operators, and reagents. There exists a need for a smart contact lens that is less bulky, easier to use, and that can include multiple test sensors that can easily be read either on the eye or after taken off.

SUMMARY

An example embodiment provides a smart contact lens with a contact lens, a nanostructures layer, a first sensor, a connector, and a smart module. The nanostructures layer may be anti-bacterial. The smart contact lens may be worn on an eye or may be implanted within an eye.

An example embodiment provides a fabrication process comprising depositing an electrostatic layer onto a substrate. A coating is deposited onto the electrostatic coating which may be a colloidal dispersion that is the opposite charge of the electrostatic layer. The colloidal dispersion may be quasi-randomly dispersed on the electrostatic layer. A second coating may be deposited onto the electrostatic layer and colloidal dispersion coating. The colloidal dispersion coating may be removed and nanoholes may be etched at the locations where the colloidal dispersion was removed. The second coating may then be removed, exposing the substrate with a new nanoholes layer, and a third layer may be deposited onto the substrate. The third layer may then be removed, forming nanostructures. The third layer may then be used as an antibacterial coating on a contact lens or may be formed into a contact lens. The third layer may then have a sensing layer deposited onto a portion of the layer to be used for sensing. There may be nanowires and smart modules formed.

An example embodiment provides for a method of drop-coating deposition and surface-enhanced Raman spectroscopy (DCDRS) of a biomaterial solution on a smart contact lens. A Raman spectrometer module may be used to perform Raman spectroscopy. A spectral shift profile may be read from the biomaterial solution on the smart contact lens.

An example embodiment provides for calibrating DCDRS-based identification of materials in a biomaterial solution. Enzyme-linked immunosorbent assay (ELISA) tests of a biomaterial solution may be compared to DCDRS tests and the DCDRS test may be calibrated.

BRIEF DESCRIPTION OF THE DRAWING

In the following section, the aspects of the subject matter disclosed herein will be described with reference to exemplary embodiments illustrated in the figures.

FIG. 2B depicts an example embodiment of the fabrication process of FIG. 2A for a nanostructures layer and a sensing layer of a smart contact lens.

FIG. 4 depicts an example embodiment of a bacteria adhering to a nanostructures layer of a smart contact lens.

FIG. 8 depicts an example embodiment of a method to calibrate DCDRS sensing for a smart contact lens according to the present disclosures.

DETAILED DESCRIPTION

Figure 1:
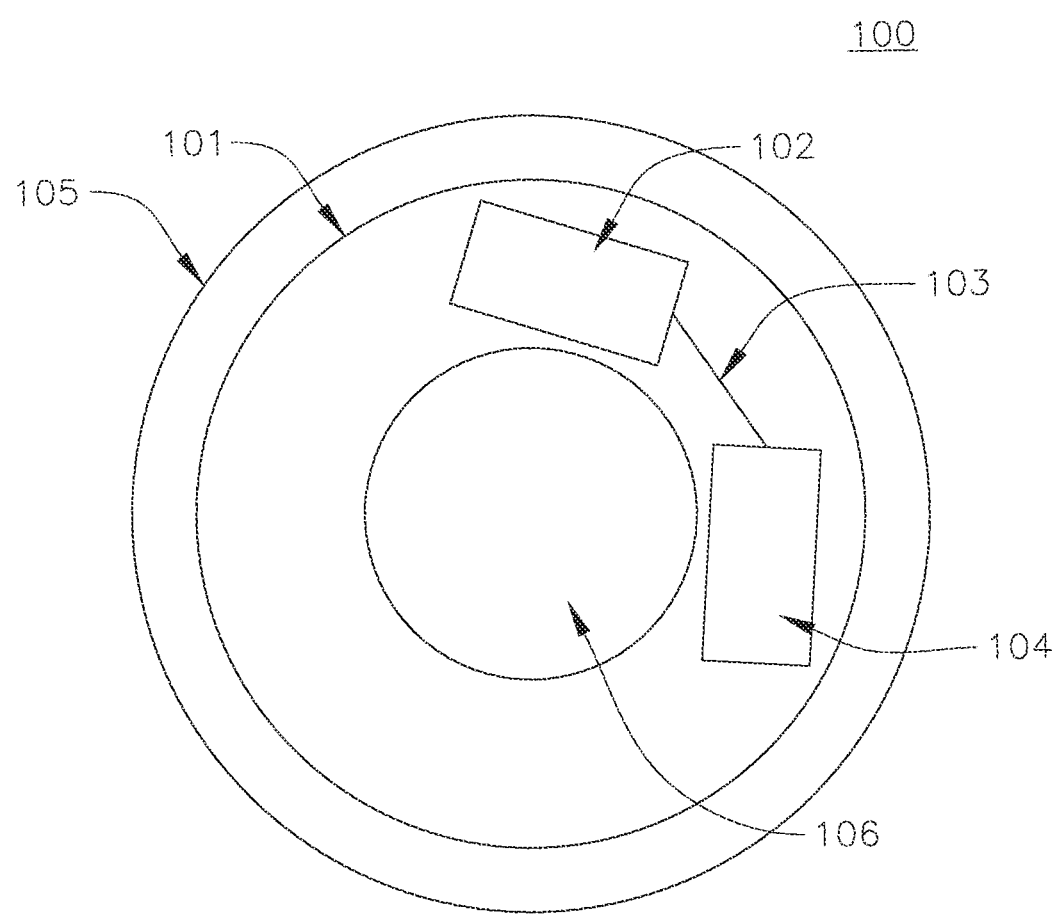
FIG. 1 depicts a top view of an example embodiment of a smart contact lens with a nanostructures coating, multiple sensing elements, and a nanowire.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary." means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional." "pre-determined," "pixel-specific." etc.) may be occasionally interchangeably used with a corresponding non-hyphenated version (e.g., "two dimensional." "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other. Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising." when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and case of discussion only: it does not imply that the construction or architectural details of such components or units are the same across all embodiments or such commonly-referenced parts/modules are the only way to implement some of the example embodiments disclosed herein.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only: it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 depicts a top view of an example embodiment of a smart contact lens 100 with a contact lens 105, a nanostructures layer 101, a sensor layer 102, a connector 103, and a smart module 104. Other embodiments may use different components in different arrangements. A contact lens 105 may be a soft contact lens which may comprise a type of polymer, such as hydrogel, silicone hydrogel, or a hypergel. It may also be a rigid gas permeable lens which may comprise polymethyl methacrylate (PMMA) or other material. Smart contact lens 100 may be worn on an eye or may be implanted within an eye. Smart contact lens 100 may have an optic zone 106 which may be a central part of the lens that contains vision-corrective optics.

Nanostructures layer 101 may be on an area comprising all or part of contact lens 105. Nanostructures layer 101 may comprise a biocompatible material such as parylene. In one embodiment, nanostructures layer 101 may be between 1 and 20 microns thick and may be applied onto contact lens 105. In another embodiment, nanostructures layer 101 may be 30 to 2000 microns thick and may be shaped or molded into contact lens 105. Nanostructures layer 101 may comprise nanostructures that are quasi-randomly distributed: that is, neither fully randomly nor fully orderly distributed. More specifically, in some embodiments, the nanostructures are randomly arranged within a set of physical parameters provided by the underlying material, as will be made apparent below. The quasi-random distribution of nanostructures on nanostructures layer 101 may allow for glare reduction over a wide range of angles. Furthermore, the nanostructures on nanostructures layer 101 may impede or stop bacteria from reproducing, which may kill bacteria. In some embodiments, nanostructures layer 101 may exhibit bacteriostatic or bactericidal properties. In other embodiments, it may also exhibit anti-viral properties.

Sensor layer 102 may be deposited on a subsection of nanostructures layer 101 or may be deposited on a separate section of contact lens 105. Sensor layer 102 may comprise the same material as nanostructures layer 101 with an additional layer. The additional layer on sensor layer 102 may be gold, silver, copper, platinum, titanium, or other metals. In another embodiment, the additional layer may be a doped semiconductor or a 2D material such as graphene. Connector 103 may be a nanowire and may connect sensor layer 102 to smart module 104, or may connect smart module 104 to additional smart modules (not shown). In another embodiment, connector 103 may be part of smart module 104 or sensor layer 102. Connector 103 may be a metal such as gold, silver, copper, platinum, titanium, or other metals. In another embodiment, connector may be a doped semiconductor or a 2D material such as graphene. Connector 103 may also comprise nanowires, and may also comprise LEDs, solar cells, or batteries. Smart module 104 may be an additional sensing element or may be a wireless power module, communication module, display module, or data storage module. There may be multiple smart modules 104 on contact lens 105. Smart module 104 may be deposited on top of nanostructures layer 101 or may be separately deposited on contact lens 105 directly.

Figure 2A:
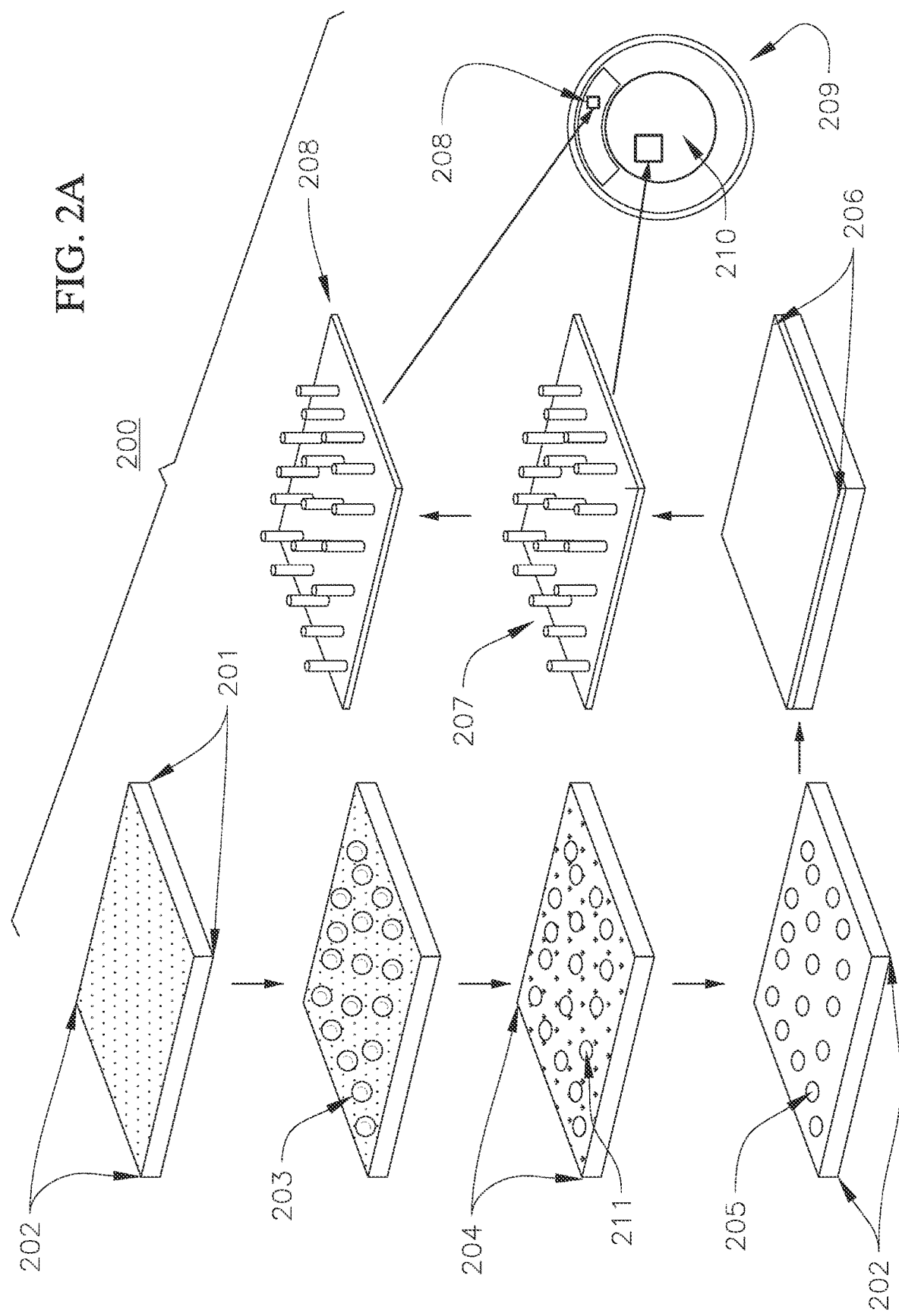
FIG. 2A depicts an example embodiment of a fabrication process for a nanostructures layer and a sensing layer of a smart contact lens.

FIG. 2A depicts an example embodiment of a fabrication process 200 for the nanostructures that comprise nanostructure element 101 and sensor layer 102 of a smart contact lens 100 of FIG. 1. Fabrication process 200 may begin with a substrate 201, which may be glass such as silica, or silicon, or another material. Substrate 201 may be pretreated with an electrostatic layer 202. Electrostatic layer 202 may be a positively or negatively charged layer. In one embodiment, layer 202 may be formed by a solution with negatively-charged ions that is spin-coated onto substrate 201. In one embodiment, layer 202 may be 1 nm to 10 nm thick. In one embodiment, layer 202 may be positively-charged polyelectrolyte poly (diallyldimethylammonium) (PDDA) that is drop-coated onto substrate 201.

A colloidal dispersion 203 may be applied onto electrostatic layer 202. Colloidal dispersion 203 may be partially charged and may have the opposite charge of layer 202. In one embodiment, colloidal dispersion 203 may comprise a solution of a colloidal dispersion of negatively-charged polystyrene nanoparticles and may be pipetted and spin-coated on to the surface of layer 202. Colloid particles of colloidal dispersion 203 may be 50 nm to 400 nm in diameter. The size chosen may depend on the desired effect, such as reflecting UV rays and reducing reflection (reducing glare) for visible spectrum. If the diameter of colloid particles of dispersion 203 are smaller the results of final processing may allow both UV and visible spectrum to pass through. As UV rays may harm eyes, a larger diameter of colloid particles may allow UV rays to be reflected. If the diameter of colloid particles of dispersion 203 are larger, they may allow visible light to pass through and may reflect UV rays. The interplay of the electrostatic repulsive forces between colloid particles of colloidal dispersion 203 and attractive forces between the surface of layer 202 and colloids of colloidal dispersion 203 may result in a quasi-random distribution of particles on colloidal dispersion 203. More specifically, in some embodiments, the distribution of charges on surface layer 202 may be originally dependent upon the chemical, electrical, and physical nature of surface layer 202, its electrostatic charge, and the chemical, physical, and electrical nature of the underlying substrate 201, and may further be modified by the nature of the colloid particles of colloidal dispersion 203. This quasi-random distribution has a random characteristic, but is limited by the aforementioned physical properties so that charge distribution is not fully random.

The colloids may be applied by spin-coating, or may be drop-coated and allowed to dry. In one embodiment, coated layer 202 and colloidal dispersion 203 may be subjected to oxygen plasma to shrink the diameters particles of colloidal dispersion 203.

An additional protective etching coating 204 may be applied and colloidal dispersion 203 may be removed. In one embodiment, protective etching coating 204 may be aluminum oxide ($Al_2O_3$) deposited by e-beam evaporation onto layer 202 and colloidal dispersion 203. The thickness of protective etching coating 204 may depend on the diameter of colloid particles of colloidal dispersion 203 and may be between 10 nm to 50 nm. For example, if colloid particles of dispersion 203 are 50 nm in diameter, the thickness of protective etching coating 204 may be smaller, such as 10 nm. If colloid particles of dispersion 203 are 400 nm in diameter, the thickness of protective etching coating 204 may be larger, such as 50 nm. Protective etching coating 204 may be a protective layer to protect layers underneath it from etching. Protective etching coating 204 may coat exposed layer 202. Further. Protective etching coating 204 may coat the tops of the colloid particles of colloidal dispersion 203 but not their sides. Thus, colloidal dispersion 203 is not attached by protective etching coating 204 to layer 202. In one embodiment, particles of colloidal dispersion 203 may be removed by tape stripping with Teflon tape after protective etching coating 204 is applied, which may be known as a lift-off technique. Tape stripping may be used because the mechanical force of removing colloid particles of colloidal dispersion 203 may be stronger than the electrostatic force bonding the colloid particles to layer 202. In another embodiment, colloidal dispersion 203 may be removed using an organic material solvent stripper, such as REMOVER PG by Kayaku Advanced Materials. After colloidal dispersion 203 is removed, nanoholes 211 may be present in the former locations of the nanoparticles of colloidal dispersion 203, exposing layer 202 through coating 204.

A nanoholes surface 205 may be formed by removing layer 202 exposed at locations of nanoholes 211 in order to create deeper nanoholes 211. In one embodiment, plasma etching may be used to remove layer 202 at the exposed locations of nanoholes 211 and may also remove a portion of substrate 201. Protective etching coating 204 may protect the rest of the surface from plasma etching. Nanoholes 211 may therefore have a deeper thickness after plasma etching. The diameter of nanoholes 211 may depend on the diameter of the colloid particles from colloidal dispersion 203. The depth may depend on the etching time and rate and may be anisotropic. In one embodiment, the depth of nanoholes may be 500 nm and the width may be 200 nm, but in other embodiments, may be other sizes.

Plasma etching may use gas such as $SF_6$ or $C_4H_8$, but others may be used, such as anisotropic dry etching. The remaining protective etching coating 204 and electrostatic layer 202 may then be removed. In one embodiment, hydrofluoric acid may be used to remove the remaining protective etching coating 204 and layer 202, but other techniques may be employed, such as a buffered oxide etching. What may remain is nanoholes surface 205 with substrate 201.

A coating 206 may be deposited onto the substrate 201 with etched nanoholes surface 205. In one embodiment, vapor deposition or sputtering deposition may be used, but other techniques may be employed. In one embodiment, coating 206 may be parylene, but may be other biocompatible materials with viscoelastic properties, such as polylactic-co-glycolic acid, poly(ε-caprolactone) (PCL), polylactic Acid, poly(3-hydroxybutyrate-co-3-hydroxyvalerate) (PHBV), chitosan, cellulose, etc. In one embodiment, coating 206 may be between 1 and 20 microns thick. Coating 206 may be removed from substrate 201 with nanoholes surface 205 by pulling it off, or demolding, to form a nanostructures layer 207. During the pull off, nanostructures on layer 207 may be deformed and as a result may not be straight structures. In one embodiment, the diameter of a nanostructure after pull off may be between 5 nm and 100 nm and the height may be between 100 nm and 2000 nm. The deformation may enable glare-reduction and antibacterial properties. Because the material of coating 206 may be elastic, when pulling it off (demolding), due to viscoelasticity it may stretch (elongate) and may thin. In one embodiment, the aspect-ratio of the nanostructures may be between 1 and 100. An aspect ratio may be the ratio of the height to the width of a nanostructure. In one embodiment, before demolding, the aspect ratio of nanostructures on layer 207 may be about 1.6, but may be other values depending on design considerations.

Nanostructures on layer 207 may be quasi-randomly distributed and may vary in both height and width. In one embodiment, the heights and widths of nanostructures on layer 207 after demolding may be approximated by a Gaussian distribution with height, h=675+/−71 nm and width, w=74+/−10 nm, respectively, which may leading to an aspect-ratio distribution of 9.1+/−1, but may be other heights and widths depending on the colloid particle diameter of colloidal dispersion 203 and the etching process when forming nanoholes 211. Nanostructures on layer 207 may be distributed to enable a Wenzel state for fluids on the surface, as will be described further in FIG. 5A.

A coating 208 may be an additional layer deposited on a subsection of layer 207 in some embodiments, such as those for making sensor layer 102. Coating 208 may comprise gold, silver, copper, platinum, titanium, or other metal. In another embodiment, the coating 208 may be a doped semiconductor or a 2D material such as graphene. In one embodiment, coating 208 may be applied by e-beam evaporation, sputtering deposition, or other method. A mask may be used on top of the layer 207 to pattern coating 208 in a predesigned shape. A similar method may be applied to create connector 103 of FIG. 1 (not shown). In one embodiment, layer 207 alone, and layer 207 with coating 208 may be cut to shape to be placed on contact lens 105 of FIG. 1, shown as a smart contact lens 209. Layer 207 alone, and layer 207 with coating 208 may be directly applied to lens 105 or may be applied with an intermediary layer. In one embodiment, layer 207 alone may be bonded to lens 105 using a clear, UV-curable epoxy and may be deposited to the anterior and posterior sides an optic zone 210 of lens 209, which may be optic zone 106 of FIG. 1. Layer 207 with Coating 208 may be bonded with a similar technique beyond the periphery of optic zone 106. In another embodiment, layer 207 may be (or cover a substantial portion of) the contact lens itself and coating 208 may be limited to a subsection of layer 207.

In other embodiments, connector 103 and smart module 104 may be applied using a similar technique described above.

FIG. 2B depicts an example embodiment process 200b of the fabrication process 200 of the elements described in FIG. 2A.

Process 220 comprises depositing a layer 202 onto a substrate 201. Substrate 201 may be glass such as silica, another material, such as silicon, or yet another material. Substrate 201 may be pretreated with an electrostatic layer 202. Electrostatic layer 202 may be a positively or negatively charged layer.

Process 221 comprises depositing a colloidal dispersion 203 onto layer 202. Colloidal dispersion 203 may be partially charged and may have the opposite charge of layer 202. In one embodiment, colloidal dispersion 203 may comprise a colloidal dispersion of negatively-charged polystyrene nanoparticles and may be pipetted and spin-coated on to the surface of layer 202. Colloidal dispersion 203 may be spin-coated on, or may be drop-coated and allowed to dry. In one embodiment, coated layer 202 and colloidal dispersion 203 may be subjected to oxygen plasma to shrink the diameters particles of colloidal dispersion 203.

Process 222 comprises depositing protective etching coating 204 onto layer 202 and colloidal dispersion 203. In one embodiment, protective etching coating 204 may be aluminum oxide ($Al_2O_3$) deposited by e-beam vapor evaporation onto layer 202 and colloidal dispersion 203. Protective etching coating 204 may serve as a protective layer to protect colloidal dispersion 203 from etching, as will be described in process 223.

Process 223 comprises removing colloidal dispersion 203 and part of protective etching coating 204 that was deposited on top of colloidal dispersion 203. In one embodiment, particles of colloidal dispersion 203 and the layer of protective etching coating 204 on top of the particles may be removed by tape stripping with Teflon tape. In another embodiment, colloidal dispersion 203 may be removed using an organic material solvent stripper, such as REMOVER PG by Kayaku Advanced Materials. Protective etching coating 204 may remain on layer 202 at all locations except where colloidal dispersion 203 was removed, i.e. where nanoholes may be formed in process 224.

Process 224 comprises etching nanoholes at the locations of where colloidal dispersion 203 was removed. During the etching process, protective etching coating 204 may remain and nanoholes may be etched to form a nanoholes surface 205. Substrate 201 may now have nanoholes at the locations where nanoparticles of colloidal dispersion 203 was initially deposited. A nanoholes surface 205 may be formed by removing layer 202 exposed at locations of nanoholes 211 that creates deeper nanoholes 211, followed by the removal of layer 202. In one embodiment, nanoholes 211 may be found where colloids of colloidal dispersion 203 were deposited. In one embodiment, plasma etching may be used to remove layer 202 at the exposed locations of nanoholes 211 and may also remove a portion of substrate 201. Protective etching coating 204 may protect the rest of the surface from plasma etching. Nanoholes 211 may therefore have a deeper thickness after plasma etching. Plasma etching may use gas such as $SF_6$ or $C_4H_8$, but others may be used, such as anisotropic dry etching.

Process 225 comprises removing the remaining protective etching coating 204 material. In one embodiment, hydrofluoric acid may be used to remove the remaining protective etching coating 204 and layer 202, but other techniques may be employed, such as a buffered oxide etching. What may remain is nanoholes surface 205 with substrate 201.

Process 226 comprises depositing a coating 206 onto substrate 201. In one embodiment, vapor deposition or sputtering deposition may be used, but other techniques may be employed. In one embodiment, coating 206 may be parylene, but may be other materials. A coating 206 may be deposited onto the substrate 201 with etched nanoholes surface 205.

Process 227 comprises pulling off coating 206 from substrate 201, forming layer 207. Coating 206 may be removed from substrate 201 with nanoholes surface 205 by pulling it off, or demolding, to form a nanostructures layer 207. During the pull off, nanostructures on layer 207 may be deformed and as a result may not be straight structures. The deformation may enable glare-reduction and antibacterial properties.

Process 228 comprises depositing coating 208 on a subsection of layer 207, forming coating 208. Coating 208 may be applied by vapor deposition, sputtering deposition, or other methods. In one embodiment, coating 208 may be gold, silver, copper, platinum, titanium, or another metal. In another embodiment, coating 208 may be a doped semiconductor or a 2D material such as graphene.

Process 229 comprises applying layer 207 onto lens 105. In one embodiment, layer 207 may be bonded to lens 105 using a clear, UV-curable epoxy and may be deposited to the anterior and posterior sides an optic zone 210 of lens 209, which may be optic zone 106 of FIG. 1. In another embodiment, process 229 may be molding layer 207 into a contact lens.

Process 230 comprises applying coating 208 onto lens 105. Coating 208 may be bonded with a similar technique beyond the periphery of optic zone 106. In other embodiments, process 230 may be skipped when layer 207 is used as the contact lens.

A similar method may be applied to create connector 103 of FIG. 1 (not shown). In one embodiment, layer 207 and coating 208 may be cut to shape to be placed on contact lens 105 of FIG. 1, shown as a smart contact lens 209. Layer 207 and coating 208 may be directly applied to lens 105 or may be applied with an intermediary layer.

Figure 3:
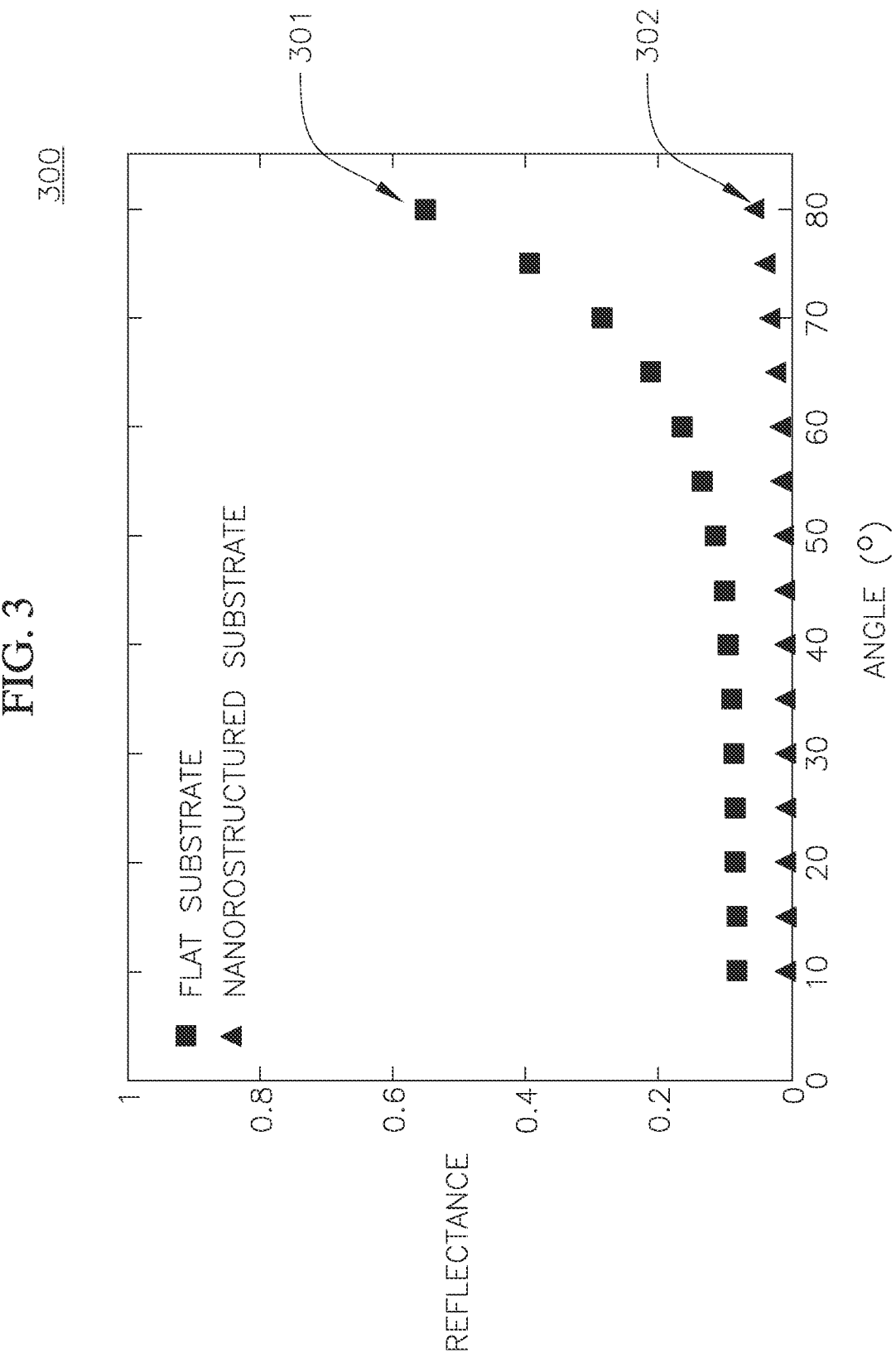
FIG. 3 depicts an example embodiment of a glare reduction result of a smart contact lens versus a regular contact lens.

FIG. 3 depicts an example of a glare reduction result 300 of a smart contact lens according to some embodiments, 302 versus a regular contact lens 301. Smart contact lens 302 may have nanostructures layer 101 of FIG. 1 whereas regular contact lens 301 may not. Contact lens may have nanostructures on one or both sides of the lens. The reflectance of lenses 301 and 302 are mapped based on the angle of incidence. In one embodiment, at all angles of incidence, smart contact lens 302 performs better than a regular contact lens 301. The quasi-randomly distributed nanostructures of layer 101 of FIG. 1 allow for a reduction of reflectance over a large range of angles of incidence.

FIG. 4 shows a top view 400a and side view 400b of an example embodiment of a bacteria cell 401 adhering to a nanostructures layer 101 of FIG. 1 of a smart contact lens. In one embodiment, bacterial cell 401 may be a rod-shaped bacterium such as *E. coli*. Nanostructures layer 101 may be antibacterial through stretching, bending, or adhesion properties. Through stretching, the nanostructures on layer 101 may stretch the membrane of bacteria cell 401 and inhibit cell growth and division. The membrane of bacteria cell 401 may also bend on top of nanostructures layer 101 which may inhibit cell growth and division. In one embodiment, the surface roughness of nanostructures layer 101 may lead to high adhesion of bacterial cell 401 which may be due to the interactions of the hydrophilic and hydrophobic membrane with nanostructures layer 101. Upon adhesion, nanostructures layer 101 may increase the deformation energy of the cell membrane of bacteria due to low bending and low stretching moduli. As a result, nanostructures layer 101 may exhibit bactericidal effects such as mechanical rupture or lysis. Additionally, deformations may cause alterations to the genomic and proteomic profile of the bacteria which may impair the growth of bacteria. For example, differentially expressed proteins may be inhibited, which may reduce the protection of bacteria to oxidative stress, irreversible protein aggregation, DNA protection, and membrane stress response. This may result in increased levels of reactive oxygen species, such as $H_2O_2$, which may mediate DNA, lipid, and protein damage that may lead to cell death. This may cause bacteria to die within 1 to 4 hour timespans on nanostructures layer 101.

More formally, the stretching, bending, and adhesion forces between bacterial cell 401 and nanostructures layer 101 described above may be modeled together to determine the total free energy change $\Delta E$ of a bacterial cell 401 adhering to a nanostructured surface and may be a function of the stretching modulus of the cell membrane, total surface area change and initial surface area of the cell, the bending modulus of the cell membrane, principal and spontaneous curvature of the bending membrane, the surface energy density between the cell membrane and the nanostructured surface, and the stretching degree of the cell membrane.

The total free energy change may be represented as a function of two variables: a half-width r of bacterial cell 401, shown as an element 403 and a contact angle $\theta$, shown as an element 402, of the bacterial cell 401 on the surface of nanostructures layer 101.

In the equilibrium stage of the adhesion process for bacterial cell 401, parameters such as the stretching degree (and the energy contributions due to stretching $E_{stretch}$, bending $E_{bend}$ and adhesion $E_{ad}$ may be extracted. The stretching degree computed for the nanostructures layer 101 may be their average half-width and short-range periodicity. In one embodiment, the stretching degree may be about 0.22. In one embodiment, a stretching degree of 0.22 may not result in rupturing of the membrane of bacterial cell 401, however, such a deformation may be sufficient in producing alterations to the genomic and proteomic profile of adherent bacteria. This may result in programmed or systemic cell death (as opposed to physical lysis) through pathways such as the induction oxidative stress and various cell signaling mechanisms.

$E_{stretch}$, $E_{bend}$ and $E_{ad}$ may be used to determine if bacteria is unable to adhere to a surface. In one embodiment, $|E_{stretch}|+|E_{bend}|>|E_{ad}|$ may present a thermodynamically unfavorable condition for adhesion of bacterial cell 401. In this condition, stretching and bending may be stronger than the energy of adhesion and a bacterial cell 401 may not be able to reproduce. In one embodiment, a simplified critical half-width of a nanostructure on nanostructures layer 101 may 5 nm, which may be smaller than the average half-width of the nanostructures on nanostructures layer 101. If the half width is above this value, the adhesion of bacterial cell 401 on the surface of nanostructures layer 101 may thermodynamically unfavorable, which means the bacterial cell 401 cannot adhere to nanostructures layer 101 and will not be able to reproduce.

Figure 5:
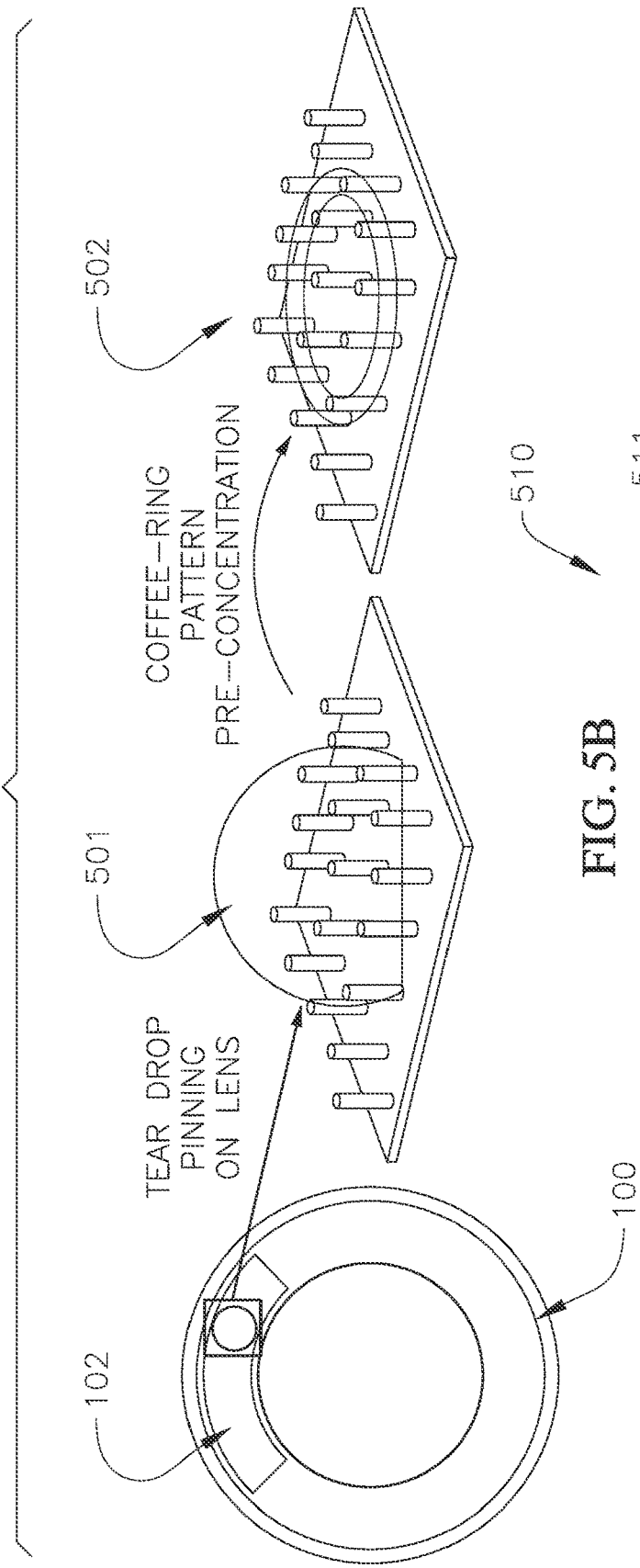
FIG. 5A depicts an example embodiment of a biomaterial solution contacting on a sensing layer of a smart contact lens according to the present disclosures.
FIG. 5B depicts an example embodiment of process to dry biomaterial onto a sensing layer of a smart contact lens according to the present disclosures.

FIG. 5A depicts an example embodiment of a biomaterial solution 501 contacting on a sensing layer 102 of a smart contact lens 100. In some embodiments, biomaterial solution 501 may be a tear. The nanostructures on sensing layer 102 may be structured to enable a Wenzel state for biomaterial solution 501. A liquid drop that impregnates the solid texture surface of layer 102 may be in a Wenzel state which may be due to contact angle hysteresis and may allow for droplet pinning of biomaterial solution 501. Droplet pinning may also be known as contact line pinning, which may create a "coffee-ring" like pattern 502 where biomaterial is more concentrated. Droplet pinning may be based on the contact angle of solution 501. A contact angle may be the angle where a liquid-vapor interface meets a solid surface, in this case, it may be solution 501 meeting the surface of sensing layer 102.

Contact angle hysteresis may act as an energy barrier to droplet movement of solution 501 on rough surfaces such as the surface of layer 102, which may lead to droplet pinning. Contact angle hysteresis may be the difference between an advancing and receding contact angle or cosine of the contact angle when the droplet volume of solution 501 on the surface of layer 102 is changed or when the droplet of solution 501 begins to slide when the surface of layer 102 is tilted. Contact angle hysteresis may be proportional to the adhesion or pinning force per unit length, which may be work done to separate a liquid-liquid or liquid-solid phase. Solution 501 may be a pinned droplet on layer 102 and may evaporate. In one embodiment, the evaporation at the edge of the pinned droplet of solution 501 may form coffee-ring pattern 502. Capillary forces that transport material from the droplet of solution 501 to the edge may also help form coffee-ring pattern 502. This may lead to a higher concentration of material that may be used later for imaging or sensing purposes that will be discussed further in FIG. 6. The coffee-ring pattern 502 may lead to segregation of different solutions. For example, salts and proteins in tears may have salts crystalizing closer to the center of the dried drop and proteins being deposited closer to the edge of coffee-ring pattern 502.

FIG. 5B depicts an example embodiment of process 510 to read biomaterial onto a sensing layer of a smart contact lens according to some embodiments.

Process 511 comprises depositing biomaterial solution 501 on sensing layer 102.

Process 512 comprises allowing biomaterial solution 501 to dry on sensing layer 102 to form coffee-ring pattern 502.

Process 513 comprises reading biomaterial solution 501 dried on sensing layer 102 by performing drop coating deposition Raman spectroscopy (DCDRS) which will be described in FIG. 6. In some embodiments, process 512 may be skipped and process 513 may comprise reading wet biomaterial solution 501.

Figure 6:
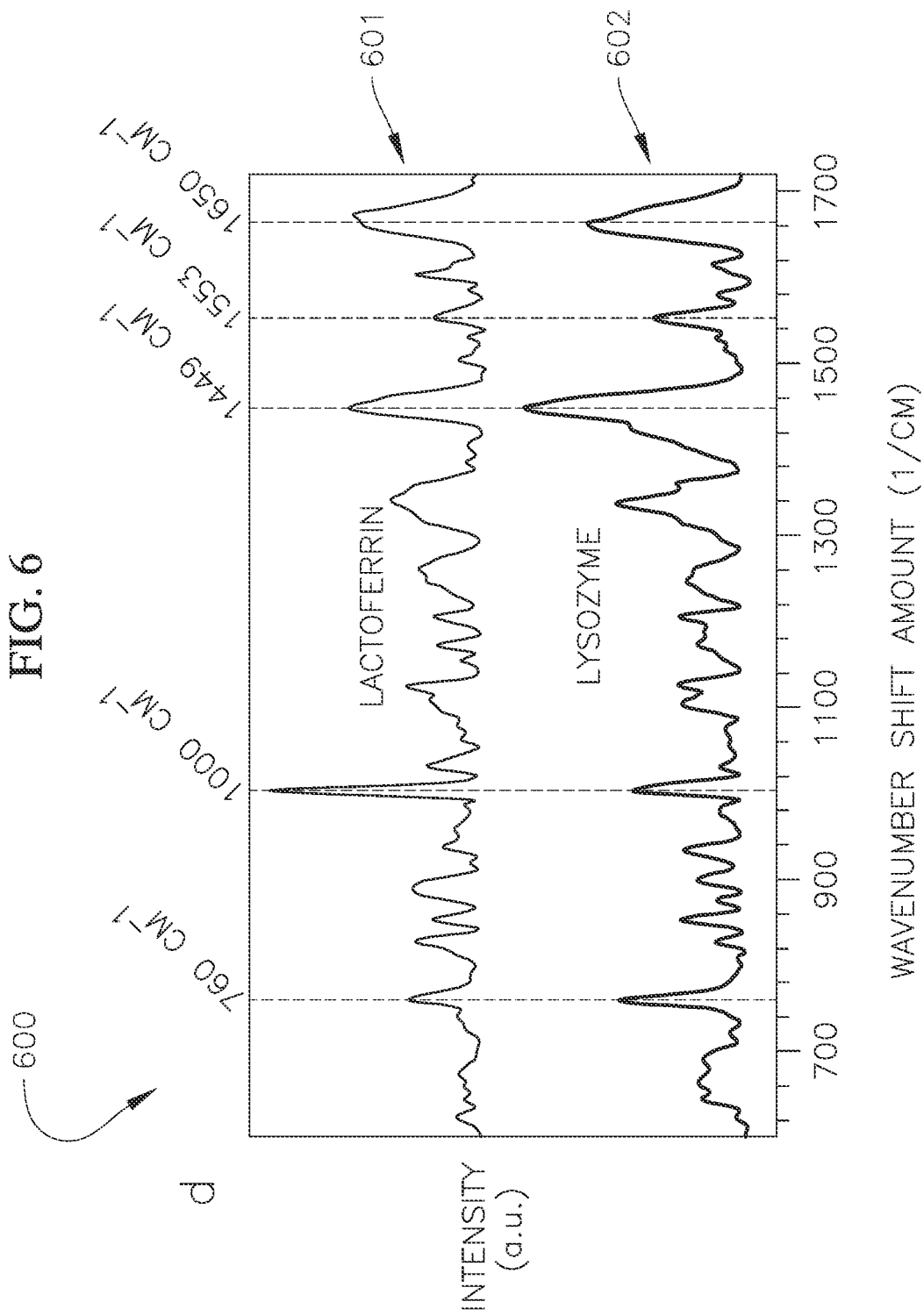
FIG. 6 depicts an example embodiment of a method of drop coating deposition Raman spectroscopy (DCDRS) of biomaterial on a smart contact lens according to the present disclosures.

FIG. 6 depicts an example embodiment of a method of DCDRS 600 of biomaterial solution 501 on a smart contact lens according to some embodiments. In one embodiment, a Raman spectrometer module may be used (not shown) to perform Raman spectroscopy. It shows a spectral shift profile 601 and 602 of two example materials or molecules. In one example embodiment, profile 601 may be for lactoferrin and profile 602 may be for lysozyme, both of which may be sampled from the coffee-ring pattern 502 of solution 501 of FIG. 5A. In other embodiments, the molecules detected in biomaterial solution 501 may be different than lysozyme and lactoferrin. In one embodiment, the spectral shift profiles 601 and 602 may be collected from a dried solution 501 of FIG. 5A, however, it may also be collected when the solution is still wet. DCDRS may be used to produce Raman spectra from different drops of biomaterial solution 501, and may be used to determine the presence of a wide variety of biomaterials. In one embodiment, the combination of droplet pinning and drying patterns of coffee-ring pattern 502 may enhance the DCDRS signal 10-fold compared to an ordinary droplet, and may result in the signal shown in profile 601, which may be used to specify the biomaterial. The biomaterial may be an amino acid, protein, or other material.

The shift amount for a given molecule may depend on the energy of the bonds in the molecule and may be used to determine the type of molecule. For example, a 785 nm wavelength may be shined on lactoferrin which may produce the wavenumber shift amount (1/cm) of profile 601. The molecular bonds of lactoferrin may differ from the molecular bonds of other molecules. The Raman shift for each type of molecule may differ as the strength of the bonds for different chemicals differ. This difference may show a different wavenumber shift and may show a different profile. DCDRS may take advantage of this Raman shift to detect various molecules such as proteins.

Figure 7:
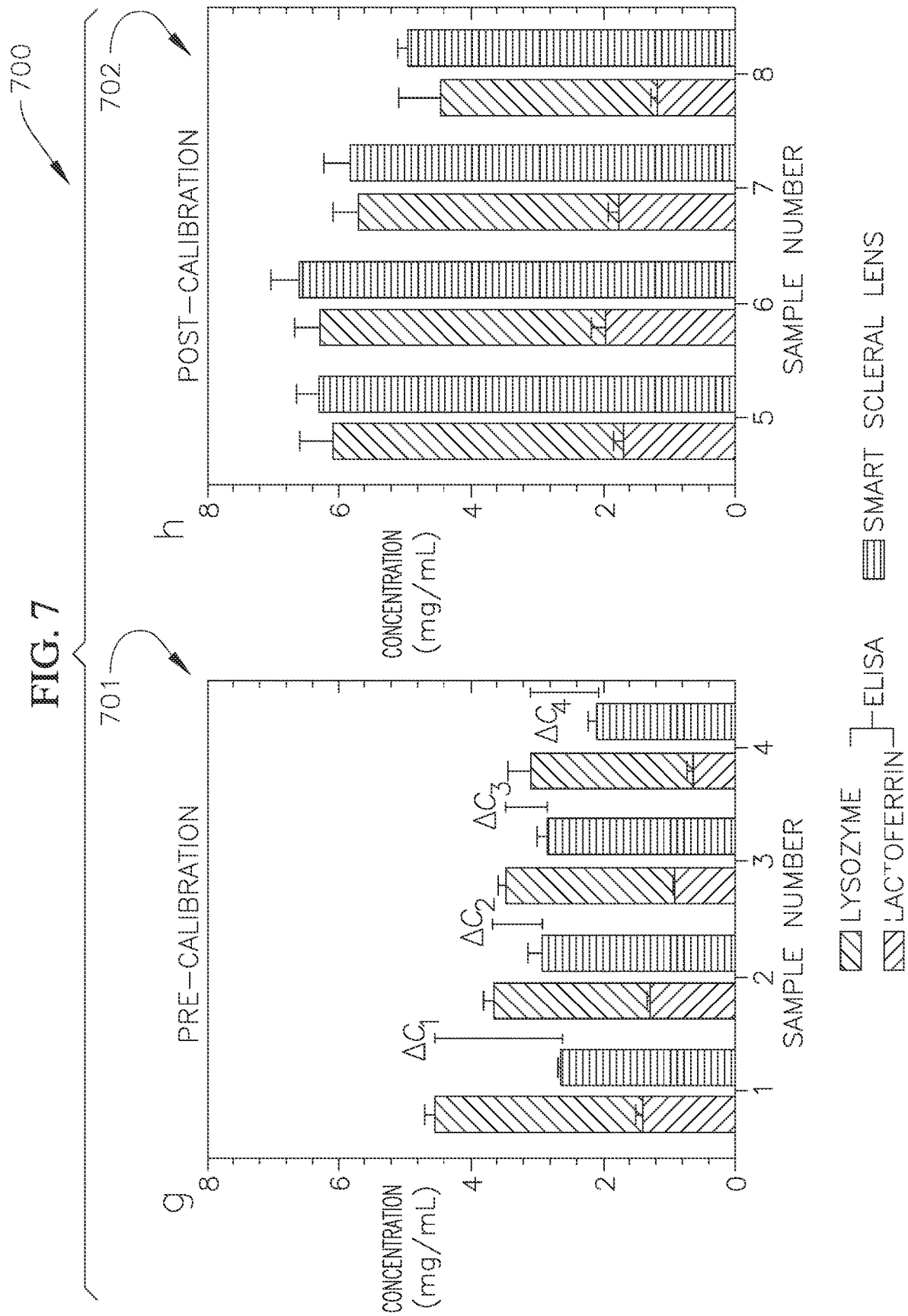
FIG. 7 depicts an example embodiment of a method to calibrate DCDRS sensing for a smart contact lens according to the present disclosures.

FIG. 7 depicts an example embodiment of a method 700 to calibrate DCDRS sensing for a smart contact lens. A pre-calibration test 701 compares four tear samples using commercial enzyme-linked immunosorbent assays (ELISAs). The four samples of biomaterial solution 501 may also be measured using DCDRS of biomaterial solution 501 on sensing layer 102. The reference ELISA measurements may be used to calibrate the response in the DCDRS measurements which may minimize the effects of potential differences between methods. The aggregated concentration of lysozyme and lactoferrin from the ELISA measurements may be computed as:

$$\mu_{agg} = \mu_{lys} + \mu_{lact}$$

$$\sigma_{agg} = \sqrt{\sigma_{lys}^2 + \sigma_{lact}^2}$$

Where $\mu_{lys}$ and Pract may correspond to the means of the independently measured concentrations of lysozyme and lactoferrin while $\sigma_{lys}$ and $\sigma_{lact}$ are their standard deviations (SDs), respectively. Comparing the aggregated means of the ELISA measurements with means of DCDRS sensor measurements, the difference on average for a given tear sample may be 0.93 mg/mL.

A post-calibration test 702 shows 4 additional tear samples and their concentration of lysozyme and lactoferrin using DCDRS of biomaterial solution 501 and comparing it to artificial tear buffers measured using ELISA The calibration of the sensing layer 102 measurements may be performed by adding the average difference of concentrations to the uncalibrated results. Post-calibration, the average difference between the means of corresponding measurements using DCDRS may be 0.27 mg/mL and standard deviation may be 0.22 mg/mL. For ELISA, the standard deviation may be 0.33 mg/mL. The improved performance may be due to the simpler testing requirements for DCDRS versus ELISA. In another embodiment, other molecules in biomaterial can be tested and calibrated to.

FIG. 8 depicts an example embodiment of a process 800 to calibrate DCDRS sensing for a smart contact lens according to the present disclosures.

Process 801 may comprise reading biomaterial solution 501 using DCDRS on sensing layer 102 and also using ELISA to read biomaterial solution 501.

Process 802 may comprise reviewing the results of DCDRS and ELISA.

Process 803 may comprise calculating the mean and standard deviation of a biomaterial in the ELISA test method and calculating the aggregate mean and standard deviation.

In other embodiments, the mean and standard deviation of any target molecule can be calculated.

Process 804 may comprise adding the difference of aggregate mean and standard deviation of the ELISA test to the DCDRS test.

Process 805 may comprise calibrating the DCDRS based on process 804.

Process 806 may comprise performing ELISA and DCDRS on new samples and confirming the calibration resulted in a lower difference in aggregate mean and standard deviation measurements.

Embodiments of the subject matter and the operations described in this specification may be implemented in digital electronic circuitry, or in computer software, firmware, or hardware, including the structures disclosed in this specification and their structural equivalents, or in combinations of one or more of the foregoing. Embodiments of the subject matter described in this specification may be implemented as one or more computer programs, i.e., one or more modules of computer-program instructions, encoded on a computer-storage medium for execution by, or to control the operation of, a data-processing apparatus. Alternatively or in addition, the program instructions can be encoded on an artificially generated propagated signal, e.g., a machine-generated electrical, optical, or electromagnetic signal that is generated to encode information for transmission to a suitable receiver apparatus for execution by a data processing apparatus. A computer-storage medium can be, or be included in, a computer-readable storage device, a computer-readable storage substrate, a random-or serial-access memory array or device, or a combination thereof. Moreover, while a computer-storage medium is not a propagated signal, a computer-storage medium may be a source or destination of computer-program instructions encoded in an artificially generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific example teachings discussed above, but is instead defined by the following claims.

Embodiments of the inventive concept may extend to the following statements, without limitation:

Statement 1: A method to fabricate nanostructures, comprising:
  Spin coating a charged electrostatic layer onto a substrate;
  Depositing a charged colloidal solution having an opposite charge from the electrostatic layer;
  Applying a mask layer over the electrostatic layer and colloidal solution;
  Removing the colloidal solution along with any mask material on the colloidal solution;
  Etching the substrate and electrostatic layer in the locations that the charged colloidal solution was removed from, via the remaining mask;
  Depositing a biocompatible layer; and
  Demolding the biocompatible layer.

Statement 2: The method of claim 1, wherein the mask layer and electrostatic layer are removed before depositing the biocompatible layer.

Statement 3: The method of claim 1, wherein the biocompatible layer comprises a biocompatible material with viscoelastic properties.

Statement 4: The method of claim 3, wherein the biocompatible layer comprises one or more of: parylene, poly-lactic-co-glycolic acid, poly($\varepsilon$-caprolactone) (PCL), polylactic acid, poly(3-hydroxybutyrate-co-3-hydroxyvalerate) (PHBV), chitosan, or cellulose.

Statement 5: The method of statement 1, wherein the charged colloidal solution comprises a colloidal dispersion of negatively-charged polystyrene nanoparticles, which are deposited in a quasi-random distribution.

Statement 6: The method of statement 1, wherein the mask layer comprises aluminum oxide ($Al_2O_3$).

Statement 7: The method of statement 1, wherein an additional layer is sputter coated onto a subsection of the biocompatible layer and comprises a metal, a doped semiconductor, or graphene.

Statement 8: The method of statement 1, wherein the demolded biocompatible layer comprise nanostructures that have a diameter between 5 nm and 100 nm and a height between 100 nm and 2000 nm Statement 9: The method of statement 1, wherein the biocompatible layer is shaped into a contact lens.

Statement 10: The method of statement 1, wherein the biocompatible layer is applied to a contact lens using a UV-curable epoxy.

Statement 11: A lens, comprising:
A nanostructures layer; and
At least one sensor layer;
Wherein the nanostructures layer further comprises a surface having nanostructures arranged in a quasi-random distribution.

Statement 12: The lens of statement 11 wherein the nanostructures layer and the sensor layer are deposited onto a base scleral lens.

Statement 13: The lens of statement 11, wherein the nanostructures layer is shaped into a scleral lens and the sensor layer is deposited onto a portion of the nanostructures layer.

Statement 14: The lens of statement 11, wherein the at least one sensor layer has an additional layer coating that comprises one or more of: gold, silver, platinum, titanium, copper, doped semiconductor, or graphene.

Statement 15: The lens of statement 11, wherein the sensor layer interacts with a biomaterial solution to pin the biomaterial solution to the surface of the sensor layer.

Statement 16: The lens of statement 11, wherein the nanostructures layer exhibits bacteriostatic or bactericidal properties.

Statement 17: The lens of statement 11, wherein the nanostructures layer has a reflectance between 0 and 0.2 for angles of incidence 0 degrees to 80 degrees.

Statement 18: The lens of statement 11, wherein the nanostructures layer comprises a biocompatible material with viscoelastic properties.

Statement 19: The lens of statement 18, wherein the nanostructures layer comprises one or more of: parylene, polylactic-co-glycolic acid, poly($\varepsilon$-caprolactone) (PCL), polylactic acid, poly(3-hydroxybutyrate-co-3-hydroxyvalerate) (PHBV), chitosan, or cellulose.

Statement 20: The lens of statement 11, further comprising at least one smart module that comprises one or more of: a sensor, a wireless power module, communication module, display module, or data storage module.

Statement 21: The lens of statement 19, wherein there are at least two smart modules, and a nanowire connects the at least two smart modules.

Statement 22: A method to read biomaterial from a solution, comprising:
Depositing a biomaterial solution onto a nanostructures layer;
Drying the biomaterial solution on the nanostructures layer to form a coffee-ring pattern of concentrated biomaterial; and
Performing drop coating deposition Raman spectroscopy (DCDRS) on the coffee-ring pattern of concentrated biomaterial; and
Identifying the biomaterial from the DCDRS.

Statement 23: The method of statement 22, wherein the nanostructures enable a Wenzel state for fluids on the surface.

The invention claimed is:

1. A lens, comprising:
a nanostructures layer; and
at least one sensor layer;
wherein the nanostructures layer further comprises a surface having nanostructures arranged in a quasi-random distribution.

2. The lens of claim 1 wherein the nanostructures layer and the sensor layer are deposited onto a base scleral lens.

3. The lens of claim 1, wherein the nanostructures layer is shaped into a scleral lens and the sensor layer is deposited onto a portion of the nanostructures layer.

4. The lens of claim 1, wherein the at least one sensor layer has an additional layer coating that comprises one or more of: gold, silver, platinum, titanium, copper, doped semiconductor, or graphene.

5. The lens of claim 1, wherein the sensor layer interacts with a biomaterial solution to pin the biomaterial solution to the surface of the sensor layer.

6. The lens of claim 1, wherein the nanostructures layer exhibits bacteriostatic or bactericidal properties.

7. The lens of claim 1, wherein the nanostructures layer has a reflectance between 0 and 0.2 for angles of incidence 0 degrees to 80 degrees.

8. The lens of claim 1, wherein the nanostructures layer comprises a biocompatible material with viscoelastic properties.

9. The lens of claim 8, wherein the nanostructures layer comprises one or more of: parylene, polylactic-co-glycolic acid, poly($\varepsilon$-caprolactone) (PCL), polylactic acid, poly(3-hydroxybutyrate-co-3-hydroxyvalerate) (PHBV), chitosan, or cellulose.

10. The lens of claim 1, further comprising at least one smart module that comprises one or more of: a sensor, a wireless power module, communication module, display module, or data storage module.

11. The lens of claim 9, wherein there are at least two smart modules, and a nanowire connects the at least two smart modules.

* * * * *